Inventor
Charles Haines Williams

UNITED STATES PATENT OFFICE.

CHARLES HAINES WILLIAMS, OF CHICAGO, ILLINOIS, ASSIGNOR TO CHICAGO RAILWAY EQUIPMENT COMPANY, OF CHICAGO, ILLINOIS, A CORPORATION OF ILLINOIS.

SAFETY-HANGER FOR BRAKE-BEAMS.

1,207,255.      Specification of Letters Patent.      Patented Dec. 5, 1916.

Application filed July 13, 1916. Serial No. 109,140.

*To all whom it may concern:*

Be it known that I, CHARLES HAINES WILLIAMS, a citizen of the United States, residing at the city of Chicago, county of Cook, State of Illinois, have invented a certain new and useful Improvement in Safety-Hangers for Brake-Beams, of which the following is a full, clear, and exact description, such as will enable others skilled in the art to which it appertains to make and use the same, reference being had to the accompanying drawings, forming part of this specification, in which—

Figure 1:
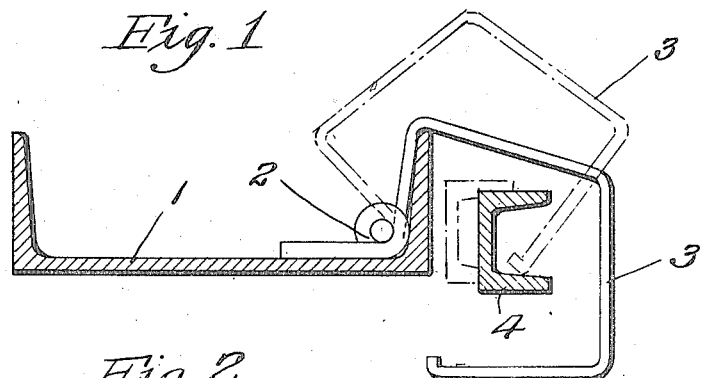
Figure 2:
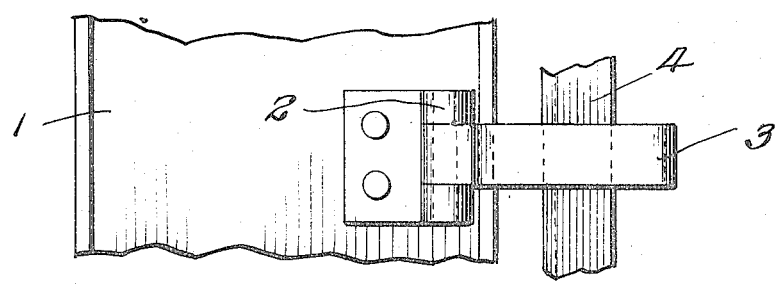
Figure 3:
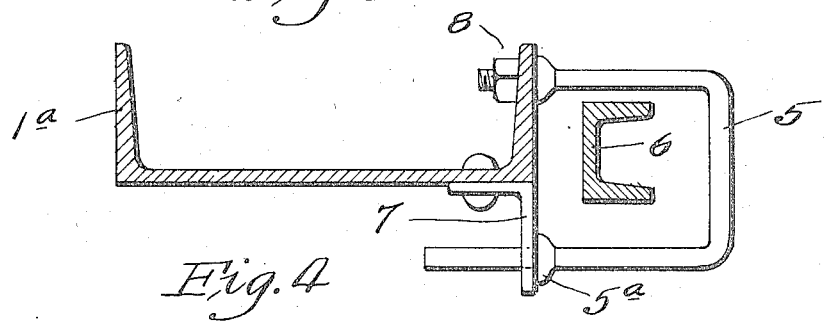
Figure 4:
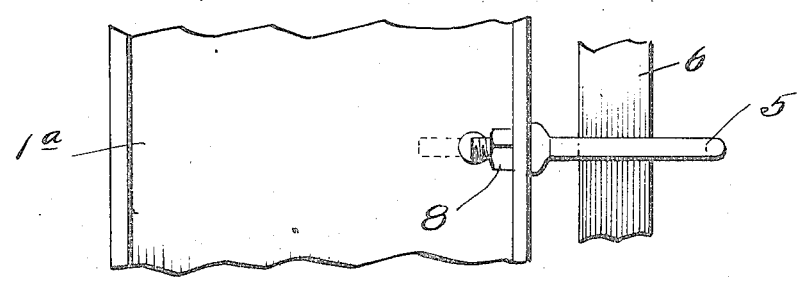

Figure 1 is a side elevational view of one form of my improved safety hanger for brake beams. Fig. 2 is a top plan view of the same. Fig. 3 is a side elevational view of another form of safety hanger. Fig. 4 is a top plan view of the form shown in Fig. 3.

This invention relates to a new and useful improvement in safety hangers for brake beams, the object being to so arrange the hanger as to permit of the ready and quick removal of the brake beam.

I am aware that safety hangers in the form of loops or stirrups, riveted to a part of the car truck, have been employed, but these forms are not readily detachable or movable to a position which will enable the quick unhanging of the brake beam.

In the drawings 1 indicates a part of the car truck, in this instance, the spring plank, to which is secured in some suitable manner a hinge eye 2. To this hinge eye is pivotally mounted an open hanger 3, which is so formed that when it is in its normal position a portion thereof engages one of the flanges of the spring plank so as to hold the hanger in operative position as shown in full lines in Fig. 1, in which the bottom leg of the hanger lies under a compression member 4 of the brake beam. If for any reason the brake beam should drop, it will be caught by the lower leg of the hanger 3, and be prevented from falling. When it is desired to remove the brake beam the same is swung inwardly, as indicated by dotted lines, when the hanger 3 can be swung upwardly out of operative position, releasing the brake beam and permitting its removal.

In Figs. 3 and 4, I have shown another form of my invention in which a removable U-shaped hanger 5 is employed to embrace the compression member 6 of the brake beam. There is a bracket 7 secured to the spring plank 1ª which bracket is provided with an opening for receiving the lower leg of the hanger which lower leg may, if desired, be provided with an enlargement 5ª forming a stop shoulder. The upper leg has a similar enlargement and the end which passes through the opening in the flange of the spring plank is threaded so as to receive a nut 8 which nut may be held against accidental displacement by a cotter pin, if desired. The operation of this form of hanger shown in Figs. 3 and 4 is the same as that illustrated in Figs. 1 and 2, except by removing the nut 8 the hanger 5 may be entirely removed to permit unhanging of the brake beam.

The lower end or leg of hanger 5 is unthreaded and made of such length that when nut 8 is removed and the hanger moved away from the spring plank to disengage the upper leg from the spring plank, the hanger may be turned down or swung about its lower leg so as to release the brake beam without disconnecting the hanger from the spring plank.

I claim:

1. A safety hanger for brake beams comprising a member bent to embrace the brake beam, or a part thereof, said member being movably mounted with relation to the part of the car truck by which it is supported whereby the brake beam may be released.

2. A combination with a part of a car truck and a safety hanger comprising a member bent to embrace the brake beam, or a part thereof, said member being movably mounted upon the car truck whereby the brake beam may be released.

In testimony whereof I hereunto affix my signature in the presence of two witnesses, this 7th day of July, 1916.

CHARLES HAINES WILLIAMS.

Witnesses:
    E. T. WALKER,
    M. F. HUNTOON.

Copies of this patent may be obtained for five cents each, by addressing the "Commissioner of Patents, Washington, D. C."